US012462954B2

United States Patent
Crane et al.

(10) Patent No.: US 12,462,954 B2
(45) Date of Patent: *Nov. 4, 2025

(54) SYSTEMS AND METHODS FOR BALANCING UNBALANCED POWER CABLES

(71) Applicant: National Oilwell Varco, L.P., Houston, TX (US)

(72) Inventors: Mitchell Lee Crane, Tulsa, OK (US); Stark Kremeier, Tulsa, OK (US); Robert McCoy, Tulsa, OK (US)

(73) Assignee: National Oilwell Varco, L.P., Houston, TX (US)

( * ) Notice: Subject to any disclaimer, the term of this patent is extended or adjusted under 35 U.S.C. 154(b) by 994 days.

This patent is subject to a terminal disclaimer.

(21) Appl. No.: 17/476,693

(22) Filed: Sep. 16, 2021

(65) Prior Publication Data

US 2022/0148761 A1 May 12, 2022

Related U.S. Application Data

(63) Continuation-in-part of application No. 17/096,414, filed on Nov. 12, 2020, now Pat. No. 11,128,278.

(51) Int. Cl.
| | |
|---|---|
| *H01B 9/00* | (2006.01) |
| *E21B 43/12* | (2006.01) |
| *F04D 13/06* | (2006.01) |
| *F04D 13/10* | (2006.01) |
| *F04D 25/06* | (2006.01) |
| *H01B 7/04* | (2006.01) |
| *H01B 7/08* | (2006.01) |

(52) U.S. Cl.
CPC ........... *H01B 9/006* (2013.01); *E21B 43/128* (2013.01); *F04D 25/0686* (2013.01); *H01B 7/046* (2013.01)

(58) Field of Classification Search
CPC ...... H01B 9/006; H01B 7/0869; H01B 7/046; F04D 25/0686; E21B 43/128
See application file for complete search history.

(56) References Cited

U.S. PATENT DOCUMENTS

| | | | | |
|---|---|---|---|---|
| 5,565,753 | A | * | 10/1996 | Chen ........................ H02P 27/02 318/809 |
| 6,566,769 | B1 | * | 5/2003 | Layton ...................... H02J 3/26 307/147 |

(Continued)

FOREIGN PATENT DOCUMENTS

JP 2000116006 A 4/2000

OTHER PUBLICATIONS

Chinese Office Action dated Jun. 21, 2024, for Application No. CN 202080092717.7 and English translation.

(Continued)

*Primary Examiner* — Timothy J Thompson
*Assistant Examiner* — Amol H Patel
(74) *Attorney, Agent, or Firm* — Conley Rose, P.C.

(57) ABSTRACT

Systems and methods for authentication may include balancing an unbalanced power cable using a transformer that has one or more phases by selecting a voltage on a tap handle; disposing a first bushing on one or more phases at a different voltage than the selected voltage; and balancing the unbalanced power cable based on the disposition of the first bushing on the one or more phases at the different voltage.

21 Claims, 7 Drawing Sheets

(56) References Cited

U.S. PATENT DOCUMENTS

2010/0155057 A1* 6/2010 Atherton .............. G01R 29/16
                                                166/250.01
2021/0384858 A1* 12/2021 Ademoye ................ H02P 6/10

OTHER PUBLICATIONS

Extended European Search Report dated Dec. 12, 2023, for Application No. EP 20888300.9.

* cited by examiner

SYSTEMS AND METHODS FOR BALANCING UNBALANCED POWER CABLES

CROSS-REFERENCE TO RELATED APPLICATIONS

The present application is a continuation in part application of U.S. Ser. No. 17/096,414 filed Nov. 11, 2020 which application will issue as U.S. Pat. No. 11,128,278 on Sep. 21, 2021. U.S. Ser. No. 17/096,414 claims priority from U.S. Ser. No. 62/934,734 filed Nov. 13, 2019. Each of the aforementioned applications are incorporated herein by reference.

FIELD OF THE DISCLOSURE

The present disclosure relates to systems and methods for balancing unbalanced power cables.

BACKGROUND

Three phase power transmission generally employs separate conductors for each phase. The conductors are within a three phase cable are generally in relatively close proximity, giving rise to inductive effects between each current carrying conductor and the remaining conductors. The instantaneous current in each of the three conductors varies with the current phase. At one instant, current is carried on one conductor and returned on a second while current within the third conductor is zero. At other times during the cycle, current is carried on one conductor and returned in equal parts on the other two conductors. The current changes result in corresponding changes in inductance between the conductors. For this reason, round cables, in which each conductor as seen from a cross-section is spaced an equal distance from the other two at the apex of an equilateral triangle, are generally preferred for three phase power transmission.

When drilling an oil well hole for oil field production, any increase in diameter of the wellbore may increase the cost of the well by thousands of dollars. Keeping the well bore relatively small to minimize cost has resulted in a change in the cable geometry used for a majority of the electrical submersible pump (ESP) industry. Historically, most cable consisted of round twisted insulated conductors and was therefore electrically balanced when transmitting power to the downhole motor. Now most cable is flat, which fits the well bore better, but creates an unbalanced impedance for electrical transmission. The cable is not designed to support its own weight requiring them to be clamped or banded to production tubing for support in the wellbore. With the advent of higher speed motors, these impedances are even more pronounced at, for example over 100 Hz and in some instances as much as 500-600 Hz or higher, rather than the standard 50/60 Hz frequencies historically employed. It should be noted that the cable in many wells can be long and the differences in impedance in each leg may cause different voltage drops in each leg.

Prior references disclose creation of losses in the higher voltage phases or tried to compensate within the surface systems creating higher stress on components but suffer numerous deficiencies. For example, U.S. Pat. No. 6,566,769 discloses the addition of additional inductors which are expensive and do not have a method of adjusting for variations in the downhole cable. The following references are incorporated herein by reference in its entireties: SPE-194411-MS by David Shipp; WO2009151680A2; CA2412083A1; U.S. Pat. No. 6,566,769B1.

In many applications, drives are sized closely to the required power (kilo-volt ampere or KVA). That is, the drive output current capability is sized close to the current needed by the motor. Even if the drive can produce more current, exceeding the motor nameplate current is usually avoided by setting the current limit of the drive. In either case, when flat cable is utilized, one phase will reach the current limit before the other two, at which time the drive cease to increase in frequency and the pump will operate at a lower RPM than desired. Accordingly, conductor inductance differences may result in significant voltage and current unbalances at the motor terminals and limit drive frequency. This imbalance is more pronounced in higher frequency motors and the longer the length of cable needed for deeper wells.

These and other deficiencies exist.

SUMMARY OF THE DISCLOSURE

Embodiments of the present disclosure provide a method of balancing an unbalanced power cable using a transformer that has one or more phases. The method may include selecting a voltage on a tap handle. The method may include disposing a first bushing on one or more phases at a different voltage than the selected voltage. The method may include balancing the unbalanced power cable based on the disposition of the first bushing on the one or more phases at the different voltage.

Embodiments of the present disclosure provide a flat or round cable. The flat or round cable may include a plurality, e.g., three or more or five or more, of conductors. At least one of the plurality of conductors may include an impedance value differing from impedance values of each of the remaining plurality of conductors. The cable may be converted from an unbalanced mode to a balanced mode by disposing a bushing on one or two or all three phases at a voltage for an electrical application such as a downhole application like one or more electrical submersible pump applications downhole.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein provide a method of taking appropriate corrective actions to the above-identified imbalance by creating a balance with the correct voltage from the step-up transformer already in the system, creating the balance of voltage and current needed by the motor connected via flat cable. The transformers utilized by the electrical submersible pump industry between the drive/switchboard and well may include step up type transformers and include adjustable taps to compensate for the voltage loss in the cable when the motor is running. The higher voltage is needed for transmitting adequate power to the downhole or surface electric motor utilizing a more cost effective (size) gauge of conductor based on the energy requirements. These taps are for all three phases and set the output voltage. The transforms may also be utilized by other industries with similar challenges, and as such are not limited to the ESP industry.

As discussed herein, the systems and methods provide numerous different implementations which allow one or more additional tap handles or one or more bushings to increase the voltage/decrease current on one or more phases relative to other phases. In some examples, this may be for two phases. For example, one or more bushings may be on one or more phases at a percentage greater or lesser than the selected voltage on the tap handle. This would result in advantageous costs and is inexpensive. The voltage difference may be fixed based on a specific bushing of attachment on the transformer for one phase only, or in other examples, for two phases only, or in other examples, for all three phases. One phase may be effective due to the geometry of a flat cable is such that only the center conductor includes a different impedance than the other two phases. This implementation may include additional turns on the transformer for that specific phase or the other two phases. The voltage difference may be created for flat cable compensation regardless of transformer model including step up or down, auto transformer, with or without phase shift, and E core or other lamination configurations.

For medium voltage drives, there is a phase shift input transformer (generally no step up transformer on the output) which may also have additional turns on one or more, e.g., a plurality of up to all phases to provide a balance for flat cables. Consequently, this implementation may create additional voltage on the modules within the drive associated with that phase.

In some examples, one or more additional tap handles, such as one or two or three additional tap handles may be configured to control selection of a percentage above the existing tap ratio to balance the voltage and current to the motor. In this manner, this implementation has the advantage that the operator may not know which is the center phase of the conductors.

Figure 1:
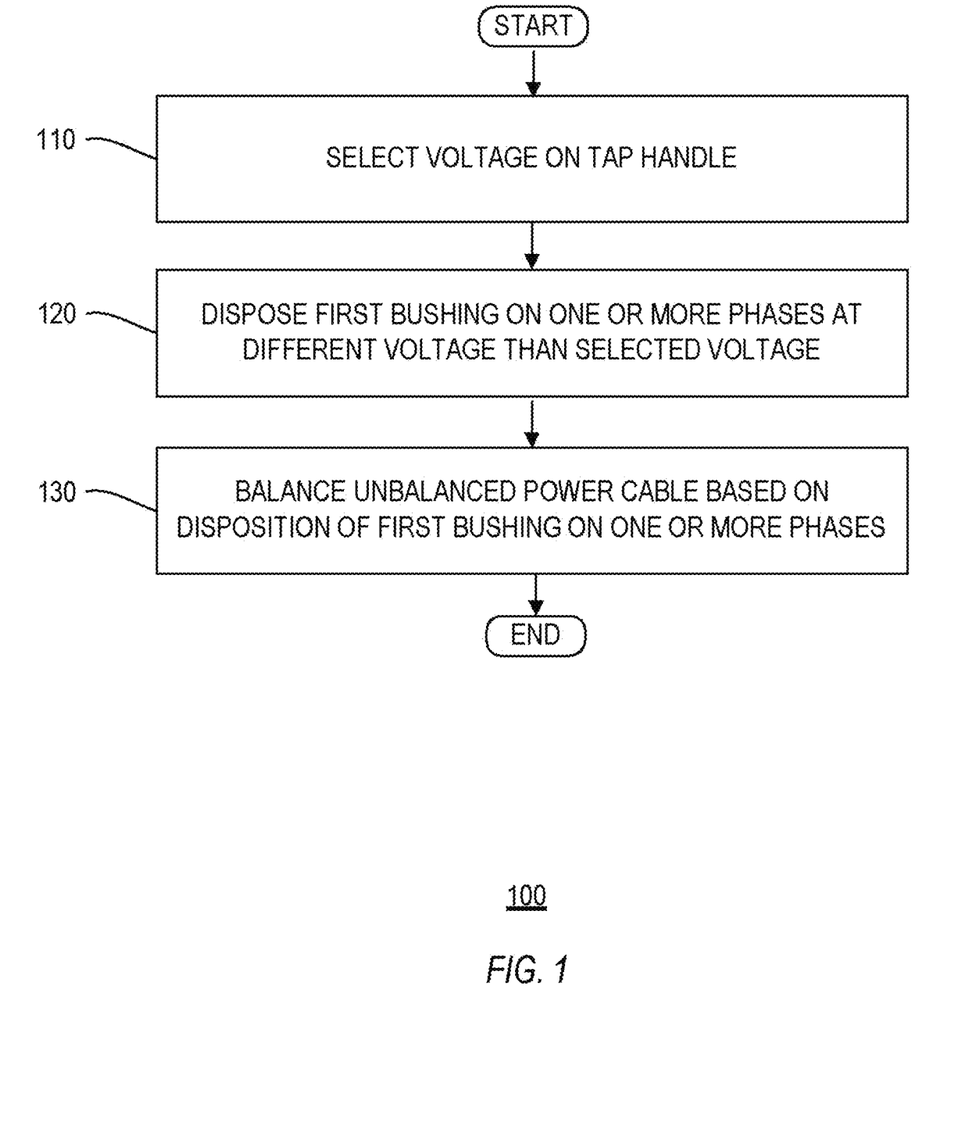
FIG. 1 depicts a method of balancing an unbalanced power cable according to an exemplary embodiment.

FIG. 1 depicts a method 100 of balancing an unbalanced power cable using a transformer that has one or more phases according to an exemplary embodiment.

At step 110, the method 100 may include selecting a voltage on a tap handle. For example, a first voltage may be selected on the tap handle. The method 100 may further include selecting, via a second tap handle, one or more changes to a line-to-line voltage.

At step 120, the method 100 may include disposing a first bushing on the one or more phases at a different voltage than the selected voltage. For example, the first bushing may be disposed on one or more phases at a second voltage than the first voltage. Without limitation, the different voltage may be less than 10 kV. The different voltage may be fixed for the one or more phases based on an attachment of the first bushing to the transformer. In another example, the different voltage may be fixed for three phases based on an attachment of the first bushing to the transformer. The method 100 may include adding additional bushings to each phase. For example, two or more additional bushings may be added to each of the one or more phases. The method 100 may further include implementing one or more turns on the transformer to fix the different or second voltage for the one or more phases. In some examples, the different voltage may differ from (higher or lower) the selected voltage by a predetermined percentage. For example, the predetermined percentage may comprise a percent range between from about 1% up to about 40%, such as 5% or 10%, or 15%, or 20% or any other desired percentage differential.

At step 130, the method 100 may include balancing the unbalanced power cable based on the disposition of the first bushing on the one or more phases at the different voltage, such as the second voltage. In some examples, the power cable may be balanced on the disposition of the first bushing on the one or more phases at a voltage that is higher or lower than the selected voltage. The method 100 may further include adjusting the voltage by implementing one or more turns on a phase-shifting transformer.

Method 100 may further comprise transmitting, based on the different voltage, power to an electrical load. Without limitation, the electrical load may comprise a permanent magnet, an induction motor, a servomotor, or a switch reluctance motor. In some examples, the method 100 may include balancing voltage and current to the electrical load through one or more additional tap handles so as to allow selection of a value exceeding a tap ratio.

The transformer may comprise a plurality of phases. The transformer may comprise a step-up transformer. In other examples, the transformer may comprise a step-down transformer. The transformer may include a plurality of cores. For example, the transformer may include an E-lamination. The transformer may include an I-lamination. The transformer may include a U-I lamination. The transformer may include primary and secondary windings configured in a plurality of configurations. For example, at least one of the configurations may comprise a wye configuration. In another example, at least one of the configurations may comprise a delta configuration. In another example, at least one of the configurations may comprise a mixed wye-delta configuration. In some examples, the method 100 may include adding impedance by utilizing a magnetic core of the transformer.

Figure 2:
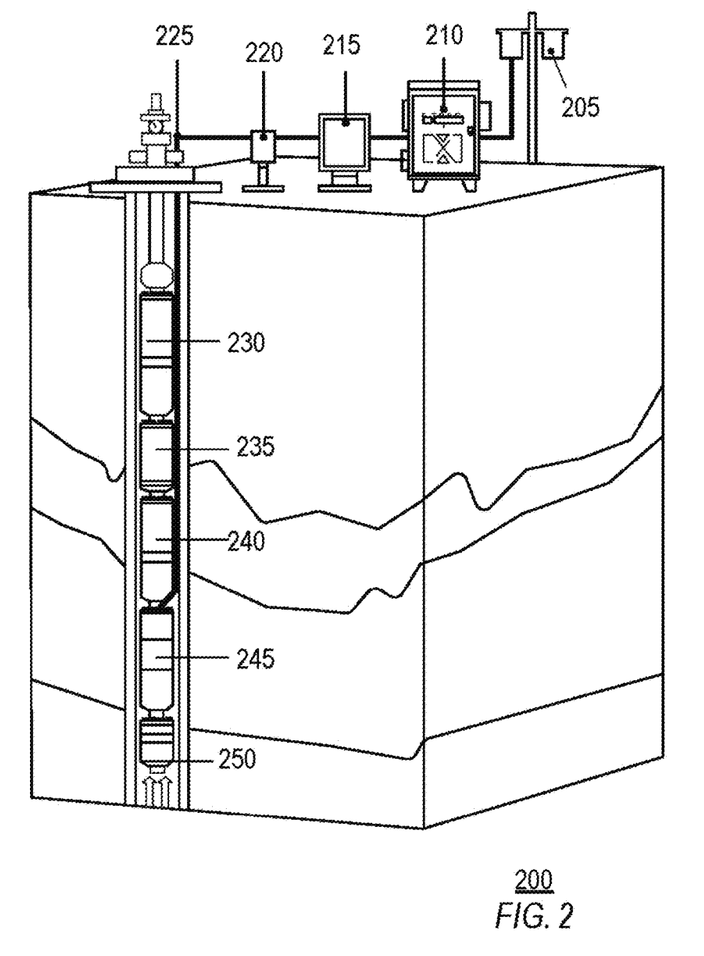
FIG. 2 illustrates an electrical submersible pump system according to an exemplary embodiment.

FIG. 2 illustrates an electrical submersible pump system (ESP) 200 according to an exemplary embodiment. As depicted, system 200 may include a first transformer 205, control module 210, a second transformer 215, a junction box 220, a cable 225, a pump 230, gas handling 235, seal 240, a motor 245, and a sensor 250. The system 200 may be configured for utilization in a well. For example, the ESP system 200 may be utilized for producing hydrocarbon and other liquids and gases from within a well bore to the earth surface. The ESP system 20 may include the pump 230, seal 240, and motor 245 located in the well bore, powered by surface power systems which may be a low voltage drive and step up transformer 215 or a switchboard motor protector. Although FIG. 2 illustrates single instances of components of system 200, system 200 may include any number of components. FIG. 2 may reference and incorporate any and all steps and components of method 100 in FIG. 1.

The transformer 215 may comprise a plurality of phases. The transformer 215 may comprise a step-up transformer. In other examples, the transformer 215 may comprise a step-down transformer. The transformer 215 may include a plurality of cores. For example, the transformer 215 may include an E-lamination. The transformer 215 may include an I-lamination. The transformer 215 may include a U-I lamination. The transformer 215 may include primary and secondary windings configured in a plurality of configurations. For example, at least one of the configurations may comprise a wye configuration. In another example, at least one of the configurations may comprise a delta configuration. In another example, at least one of the configurations may comprise a mixed wye-delta configuration. In some examples, a magnetic core of the transformer 215 may be utilized to add impedance on one, two, or three phases.

Cable 225 may reference cable 500, as further explained below with respect to FIG. 5.

ESP system 200 may run unbalanced due to the flat cable requirement geometry constraint which provides for shorter life of the equipment, increased power cost, reduced efficiency and mismatches in sizing. When a flat cable is utilized to transmit power to a three-phase motor, the differing conductor inductances may cause small changes in the voltage amplitude and phase at the motor terminals. The small differences in voltages may cause relatively large differences in phase currents, with those unbalances causing additional voltage drops and worsening the unbalance until an equilibrium is reached. The use of long lengths of flat cable to transmit power to a three-phase motor may result in current unbalance on the order of 10 to 15 percent. As discussed above, if three conductors are balanced such as a 3-phase 60 Hz or other frequency circuit, with distances to center line are equal in magnitude, then the voltages induced will be equal in magnitude but 120 degrees out of phase. Thus, the vector sum of all voltages induced in the wire is zero.

Figure 3A:
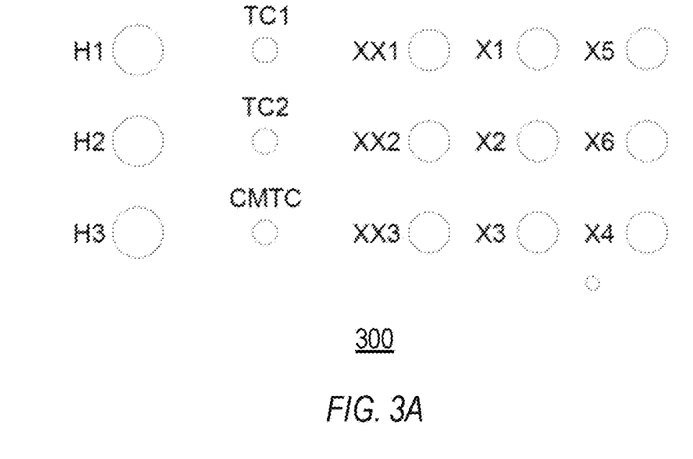
FIG. 3A illustrates a set of bushings according to an exemplary embodiment.
Figure 3B:
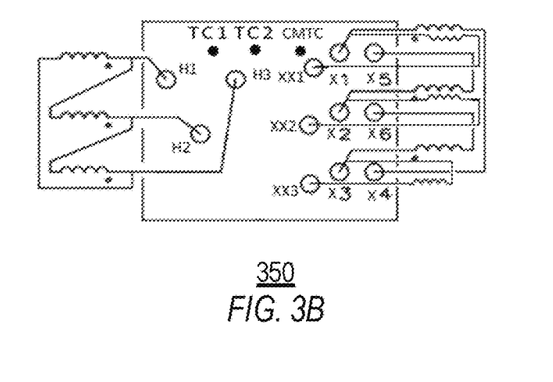
FIG. 3B illustrates a transformer according to an exemplary embodiment.

As illustrated in FIGS. 3A and 3B, an exemplary auxiliary set of bushings 300 and transformer 350 illustrating tap configuration is provided according to an exemplary embodiment. Although FIGS. 3A and 3B illustrate single instances of bushings 300, any number of bushings may be included. FIGS. 3A and 3B may reference and incorporate any and all steps and components of method 100 in FIG. 1, and system 200 in FIG. 2.

These bushings may comprise high voltage (HV) bushings. High voltage leads may be denoted by H, such as H1, H2, H3. The HV bushings are denoted XX, and are relative to the normal X-side line leads, such as XX1, XX2, XX3. In some examples, one or more additional bushings may be added to each phase and an additional one tap handle, such as a Common Mode Tap Changer (CMTC). The new tap handle may be configured to elect changes to the line to line voltage. The CMTC may be configured to change the line to line voltage of the XX outputs. The X outputs represent the outputs for the line leads, whose line-line voltage may be controlled by TC1, TC2. The wye configuration may be formed by tying X4, X5, and X6 together, for example, and may be done internally and brought out to a single X0 bushing to save cabinet space for a permanent wye HV configuration). Whichever phase that is designated as the common mode compensating phase may then be moved from that X1, X2 or X3 bushing over to the XX1, XX2 or XX3 bushing.

Figure 4:
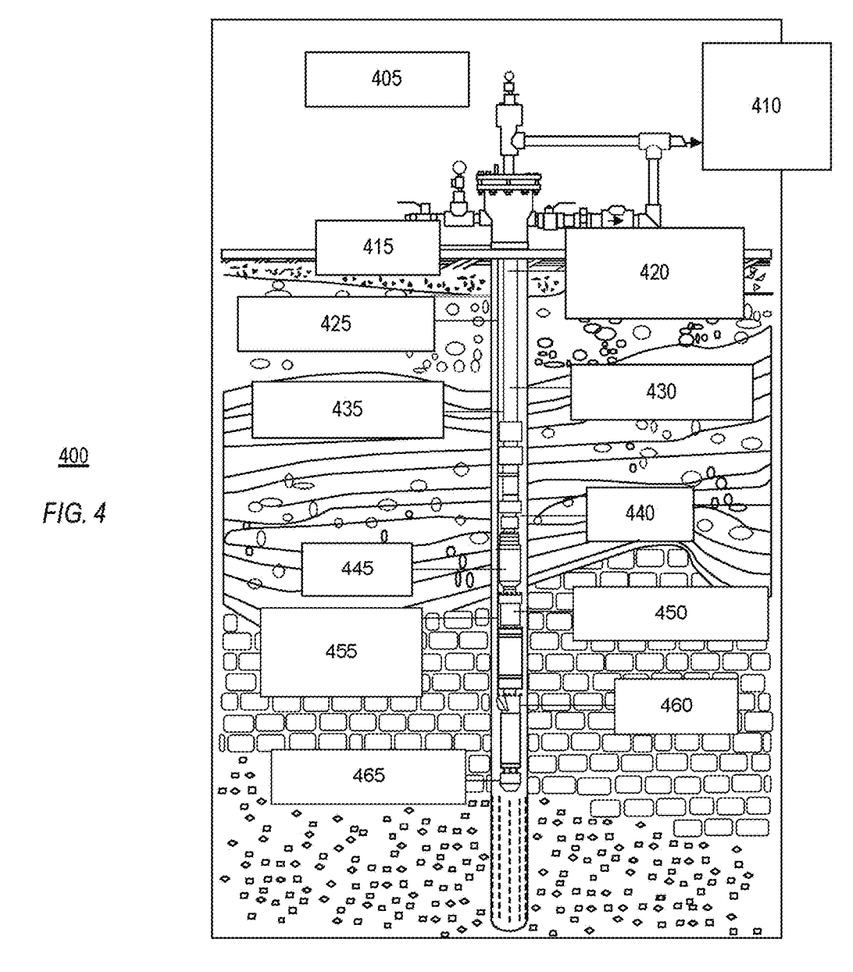
FIG. 4 illustrates a subsurface wellbore system according to an exemplary embodiment.

FIG. 4 illustrates a schematic of subsurface wellbore system 400 according to an exemplary embodiment. The system 400 may include a well head 405, output 410 to a battery, such as a central battery, casing 415, production tubing 420, power cable 425, drain valve 430, check valve 435, pump 440, intake 445, seal section 450, motor flat cable 455, sensor 460, and perforations 465. FIG. 4 may reference the same or similar components of method 100, system 200, and bushings and transformer of FIGS. 3A and 3B. Although FIG. 4 illustrates single instances of components of system 400, system 400 may include any number of components. FIG. 2 may reference and incorporate any and all steps and components of method 100 in FIG. 1, system 200 of FIG. 2, bushings and transformer of FIGS. 3A and 3B, and cable 500 of FIG. 5.

Figure 5:
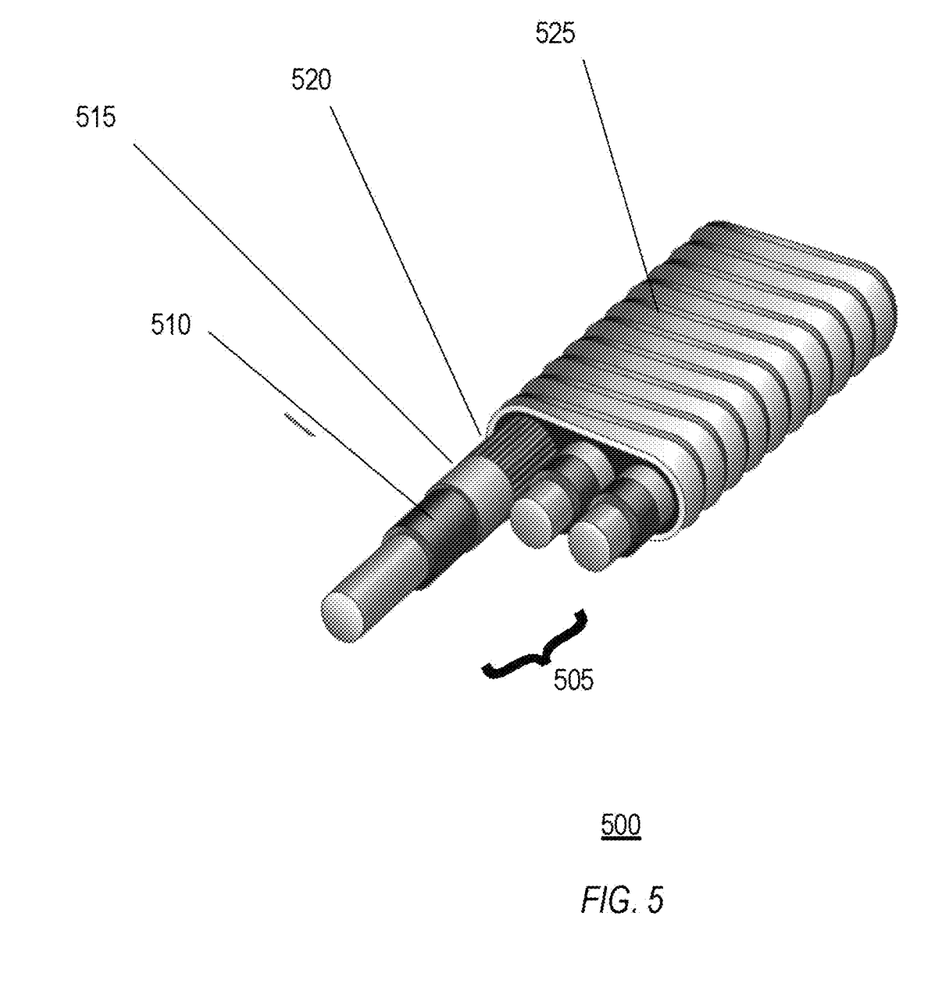
FIG. 5 illustrates a flat cable according to an exemplary embodiment.

FIG. 5 depicts a schematic of a cable 500 according to an exemplary embodiment. FIG. 5 may reference and incorporate any and all steps and components of method 100 in FIG. 1, system 200 in FIG. 2, bushings and transformer in FIGS. 3A and 3B, and system 400 in FIG. 4.

Cable 500 may include an electrical submersible pump cable or other electrical cable. Cable 500 may comprise a plurality such as three or more of conductors 505. Cable 500 may comprise an insulation 510. Cable 500 may comprise a barrier 515. Cable 500 may comprise bedding tape 520. Cable 500 may comprise an armor 525. For example, cable 500 may include Type HTF3 Flat Electrical Submersible Pump Cable by Kerite®.

The cable 500 may comprise a round or flat power cable. As used herein, "round" includes triangular configurations of cable. The cable 500 may further include a plurality, such as three or more, of conductors 505. In some examples, one or more conductors selected from the plurality of conductors 505 may comprise an impedance value different from the remaining conductors 505 of the cable. For example, one of the conductors may include a different impedance value than each of two remaining conductors 505 of the cable 500. The plurality of conductors 505 may be sequentially arranged on a horizontal axis. Further, the cable 500 may be balanced and configured for one or more electrical submersible pump applications downhole. The cable 500 may be injected into a length of coiled tubing. As explained above, the cable 500 may be converted from an unbalanced mode to a balanced mode by disposing a bushing on one or two of three phases at a voltage for one or more electrical submersible pump applications downhole. The cable 500 may include one or more additional bushings disposed at each of the second and third phases. In some examples, the voltage may exceed a value than that selected by a tap handle. As previously explained, the cable 500 may be configured to transmit power to an electrical load.

The cable 500 may include a variety of dimensions. Without limitation, a length of the cable 500 may exceed 5,000, or exceed 6,000, or exceed 7,000, or exceed 10,000, or exceed 12,000 feet. In another example, a length of the cable 500 may comprise about 15,000 feet. The width of the cable 500 may include a range of about 1 inch to 2 inches, such as 1.5 inches. The thickness of the cable 500 may include a range of about 0.1 inches to about 1 inches, such as 0.5 inches.

The cable 500 may be a #2, #4, or #6 AWG conductor, insulated with polypropylene or ethylene propylene diene monomer (EPDM), and covered with nitrile or lead jacket (for downhole protection) and covered or wrapped with a galvanized steel, stainless steel or Monel® armor. For example, a #4 AWG EPDM/Lead Flat 5 KV cable may include a DC resistance of 0.258 ohms per thousand feet with and XL of 0.042 uh/1000 feet and Xc of 0.0648 uf/1000 feet. These impedances may increase with the length of the cable 500 as per the depth of well.

Figure 6A:
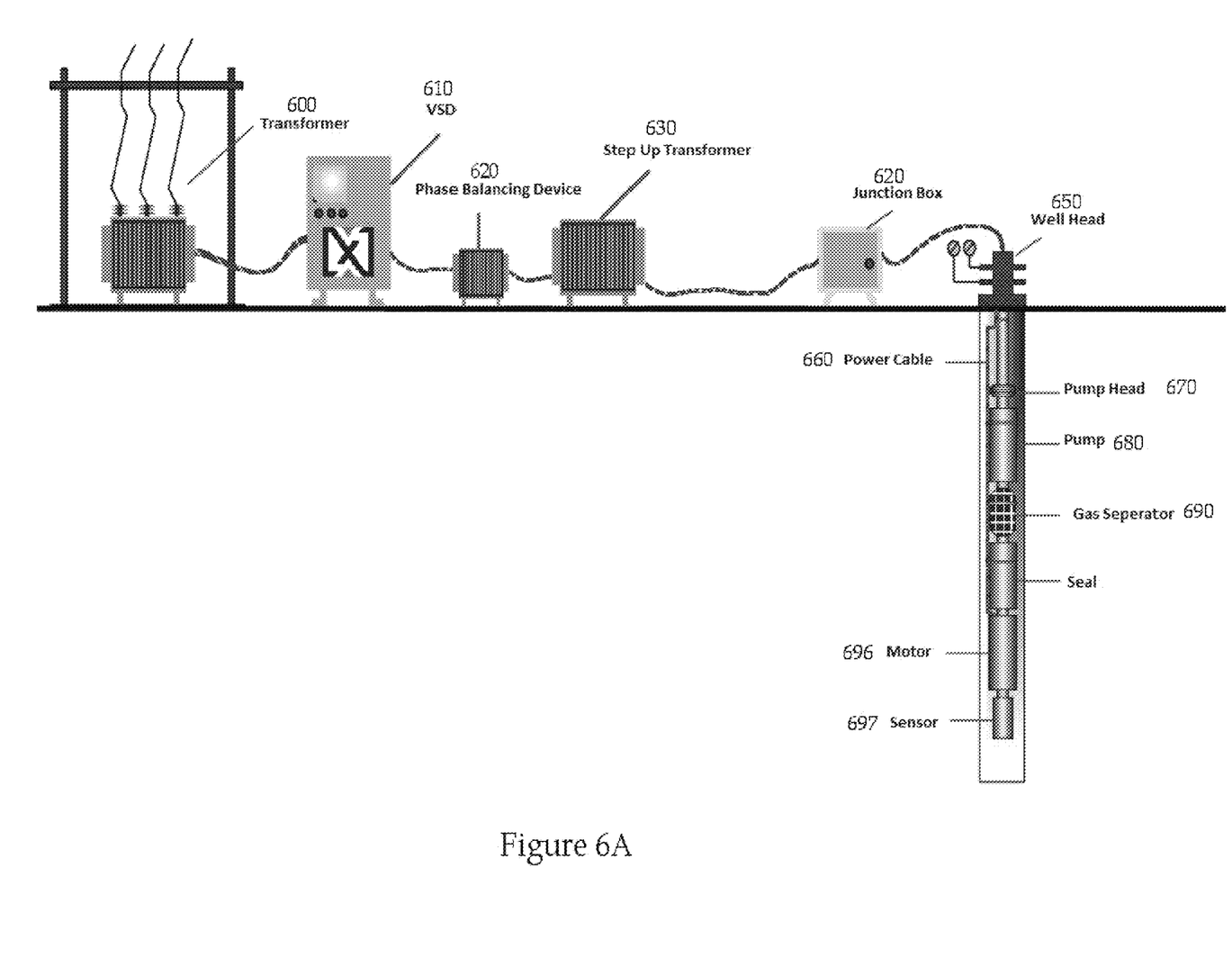
FIG. 6A illustrates a subsurface wellbore system according to an exemplary embodiment.

FIG. 6A shows operably connected components including a first transformer 600, a control module such as, but not limited to, variable speed drive 610, a balancing device such as, but not limited to, a phase balancing device 620 in FIG. 6A but could also be a voltage balancing device 625, a second transformer such as, but not limited to, step up transformer 630, junction box 640, well head 650, power cable 660, pump head 670, pump, 680, gas separator 690, seal 695, motor 696, and sensor 697. FIG. 6A may reference the same or similar components of method 100, system 200, and bushings and transformer of FIGS. 3A and 3B. Although FIG. 6A illustrates single instances of components the system may include any number of components.

Figure 6B:
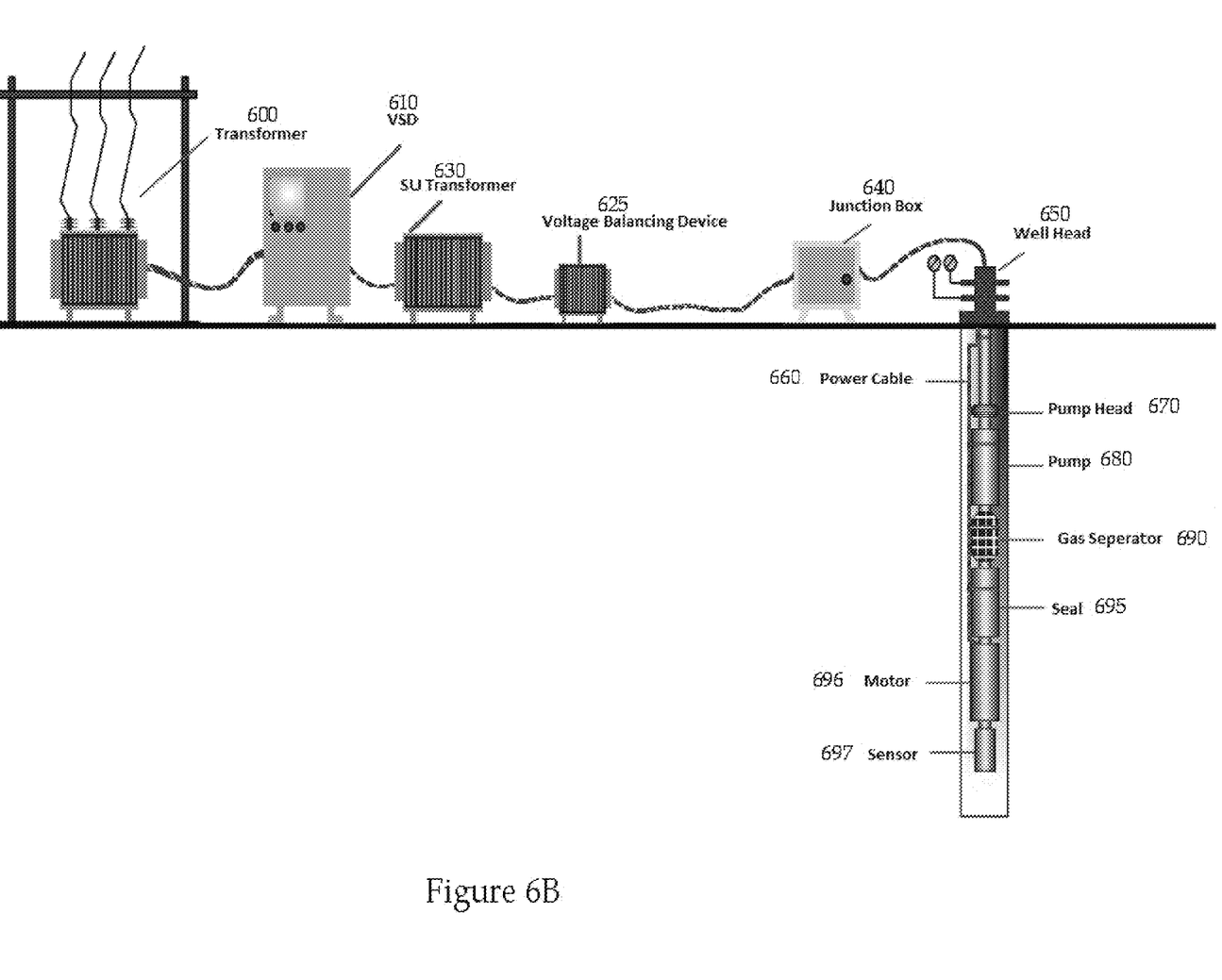
FIG. 6B illustrates a subsurface wellbore system according to an exemplary embodiment.

FIG. 6B is similar to FIG. 6A except that as shown FIG. 6B employs a balancing device which is a voltage balancing device 625 which may be substituted in some embodiments with phase balancing device 620 depending upon the desired configuration. The voltage balancing device allows one to add or remove voltage as required by the system. In some embodiments one may create losses using the methods described above when a voltage reduction is desired.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A power cable, comprising:
   three or more conductors, wherein at least one of the three or more conductors comprises an impedance value differing from impedance values of each of the remaining three or more conductors, wherein the cable is converted from an unbalanced mode to a balanced mode by disposing a bushing on one or more of three phases at a voltage for an electrical application.

2. The power cable of claim 1, wherein a length of the cable exceeds about 5,000 feet.

3. The power cable of claim 1, wherein a length of the cable exceeds about 10,000 feet.

4. The power cable of claim 1, further comprising one or more additional bushings disposed at each of second and third phases.

5. The power cable of claim 1, wherein the voltage exceeds a value than that selected by a tap handle.

6. The power cable of claim 1, wherein the cable is configured to transmit power to an electrical load.

7. The power cable of claim 6, wherein the electrical load comprises a permanent magnet, induction motor, a servomotor, or a switch reluctance motor.

8. The power cable of claim 1, wherein the three or more conductors are sequentially arranged on a horizontal axis.

9. The power cable of claim 1, wherein the cable comprises a width of about 1.5 inches and a thickness of about 0.5 inches.

10. The power cable of claim 1, wherein the cable is injected into a length of coiled tubing.

11. The power cable of claim 1, wherein the cable is round.

12. The power cable of claim 1, wherein the cable is flat.

13. The power cable of claim 1, wherein the electrical application is a downhole application.

14. A system comprising:
    an electrical submersible pump operably connected to a power supply by a power cable, wherein at least a portion of said power cable comprises:
    three or more conductors, wherein at least one of the three or more conductors comprises an impedance value differing from impedance values of each of the remaining three or more conductors, wherein the cable is converted from an unbalanced mode to a balanced mode by disposing a bushing on one or more of three phases at a voltage for the electrical submersible pump.

15. The system of claim 14 wherein the power supply comprises a transformer.

16. The system of claim 14 further comprising a variable speed drive operably connected to the power supply and the electrical submersible pump.

17. The system of claim 14 further comprising a step up transformer operably connected to the power supply and the electrical submersible pump.

18. The system of claim 14 further comprising a voltage balancing device operably connected to the power supply and the electrical submersible pump.

19. The system of claim 14 further comprising a phase balancing device operably connected to the power supply and the electrical submersible pump.

20. The system of claim 14 wherein the power supply comprises a transformer and wherein the system further comprises an operably connected variable speed drive, an operably connected step up transformer, and an operably connected phase balancing device.

21. The system of claim 14 wherein the power supply comprises a transformer and wherein the system further comprises an operably connected variable speed drive, an operably connected step up transformer, and an operably connected voltage balancing device.

* * * * *